United States Patent
Lee et al.

(10) Patent No.: US 7,079,811 B2
(45) Date of Patent: *Jul. 18, 2006

(54) DUAL MODE BLUETOOTH/WIRELESS DEVICE WITH POWER CONSERVATION FEATURES

(75) Inventors: Wayne A. Lee, Los Altos, CA (US); Ganesh Pattabiraman, Stanford, CA (US); Thomas E. Wendoll, Campbell, CA (US)

(73) Assignee: Qualcomm, Incorporated, San Diego, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 10/813,869

(22) Filed: Mar. 30, 2004

(65) Prior Publication Data

US 2004/0185857 A1    Sep. 23, 2004

Related U.S. Application Data

(63) Continuation of application No. 10/077,123, filed on Feb. 15, 2002, now Pat. No. 6,741,836, which is a continuation-in-part of application No. 09/930,759, filed on Aug. 15, 2001.

(51) Int. Cl.
*H04B 13/02*   (2006.01)
*H04B 15/00*   (2006.01)
*H04Q 7/20*    (2006.01)

(52) U.S. Cl. .............. 455/41.2; 455/343.1; 455/343.2; 455/343.4; 455/426.1; 455/502

(58) Field of Classification Search ............... 455/41.2, 455/502, 574, 342.2, 552.1, 553.1, 426.1, 455/41.3; 370/350, 503, 504, 411, 500, 515
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,940,431 A | 8/1999 | Haartsen et al. | |
| 6,574,211 B1 | 6/2003 | Padovani et al. | |
| 6,741,836 B1 * | 5/2004 | Lee et al. ................. | 455/41.2 |

FOREIGN PATENT DOCUMENTS

EP    1 089 578 A2    4/2001

* cited by examiner

*Primary Examiner*—Nick Corsaro
*Assistant Examiner*—Yuwen Pan
(74) *Attorney, Agent, or Firm*—Philip R. Wadsworth; Thien T. nguyen; Kam T. Tam

(57) ABSTRACT

In a dual mode Bluetooth/wireless mobile unit, the next sleep mode Bluetooth wakeup time is rescheduled to synchronize with any upcoming idle mode wireless wakeup time that will otherwise precede the Bluetooth wakeup time. The Bluetooth clock is advanced, or other reconfiguration made to the Bluetooth module, as appropriate to prevent the scanning frequency from changing during a sleep mode Bluetooth wakeup/scanning interval commencing at the resynchronized Bluetooth wakeup time.

1 Claim, 4 Drawing Sheets

DUAL MODE BLUETOOTH/WIRELESS DEVICE WITH POWER CONSERVATION FEATURES

CLAIM OF PRIORITY UNDER 35 U.S.C. §120

The present Application for Patent is a Continuation and claims priority to patent application Ser. No. 10/077,123 entitled "DUAL MODE BLUETOOTH/WIRELESS DEVICE WITH POWER CONSERVATION FEATURES" filed Feb. 15, 2002, now U.S. Pat. No. 6,741,836, which is assigned to the assignee hereof and hereby expressly incorporated by reference herein, and which is a Continuation-In-Part of co-pending U.S. patent application Ser. No. 09/930,759, entitled "METHOD FOR REDUCING POWER CONSUMPTION IN BLUETOOTH AND CDMA MODES OF OPERATION," filed on Aug. 15, 2001, and which is also assigned to the assignee hereof and hereby expressly incorporated by reference herein.

BACKGROUND

1. Field

The present invention relates generally to wireless communication devices and systems and more specifically to the reduction of power consumption in a dual mode Bluetooth/wireless mobile unit.

2. Background

"Bluetooth" is a wireless personal area network technology supporting wireless voice and data communication between different devices that are typically within ten to one hundred meters of one another. A number of different devices can be Bluetooth-enabled, for example, cell phones, personal digital assistants, and laptop computers. Each such device is equipped with Bluetooth components, including a receiver and transmitter, allowing it to communicate with other nearby, similarly equipped devices, without the use of cables or other physical connections.

As an example, a wireless code division multiple access (CDMA) cell phone can be Bluetooth-enabled, meaning that the cell phone is able to communicate in both the CDMA network and the Bluetooth network. Such a Bluetooth-enabled CDMA cell phone includes both Bluetooth and CDMA components.

In Bluetooth-enabled devices, the Bluetooth component may engage in various "sleep" modes to reduce power consumption. These may also be referred to as "idle" modes. One example is a "page scan" mode, which is utilized when the device is not actively communicating with other Bluetooth-enabled devices, i.e. it is not participating in a Bluetooth network. While in the page scan mode, the Bluetooth component periodically performs a wakeup process during which it scans the surrounding environment to determine whether other Bluetooth-enabled devices are trying to establish communications, in which case the Bluetooth device exits the page scan mode and engages in communications with such devices. If the Bluetooth component encounters another Bluetooth-enabled devices during the wakeup/scanning process and determines that a connection is needed, it can perform certain protocols in order to establish a short-range, wireless connection with that other device. Otherwise, the wakeup/scanning process is turned off until the next wakeup process. The sleep cycle of waking-up, scanning, and turning off repeats typically once, twice, or four times every 1.28 seconds for the duration of the page scan mode. However, certain Bluetooth specifications may vary the timing and pattern of the cycle, for example requiring that the process be performed continuously for 1.28 seconds, or repeating the process sixteen times every 1.28 seconds. Further, certain Bluetooth specifications require that the Bluetooth wakeup process repeat, for example, at least once every 1.28 seconds, every 2.56 seconds, or any other interval required by a particular specification.

In embodiments where the Bluetooth device also includes a CDMA cell phone ("phone"), the phone's CDMA component performs CDMA related tasks while the phone's Bluetooth component scans for other Bluetooth-enabled devices as discussed above. Since CDMA requires precise time synchronization between the phone and the base station, one task of the CDMA component is to synchronize with the base station. In order to synchronize with the base station while in a CDMA idle mode, the CDMA component "wakes up" periodically during its allotted time slots to receive and process pilot signals from the base station on the CDMA paging channel. The CDMA component can synchronize with the base station by processing the pilot signals. For instance, the system time can be determined from the information embedded in the pilot signals.

The wakeup frequency of the CDMA component is governed by the slot cycle index (SCI), which can be set by either the phone or the base station, as is known in the art. If the SCI is zero, the CDMA component performs a wakeup process every 1.28 seconds, i.e. its allotted time slot comes around every 1.28 seconds. As a different example, the SCI can be set at one, in which case the wakeup process is performed every 2.56 seconds, or two, in which case the wakeup process is performed every 5.12 seconds. Thus, lower SCIs mean more frequent wakeup processes, and greater power consumption At any rate, the dual mode Bluetooth/CDMA device consumes power whether it is the Bluetooth component waking up and scanning for other Bluetooth-enabled devices and then shutting down or the CDMA component waking up and synchronizing with the base station and then shutting down. Further, because each of these independent processes is performed repeatedly, power consumption can be substantial. Since an important advantage of dual mode Bluetooth/CDMA devices is their portability, they often rely on a small battery for their sole source of power. High power consumption in this environment therefore requires more frequent recharging. At best, this is inconvenient. At worst, the dual mode Bluetooth/CDMA device will cease to operate if the battery dies without a nearby recharging source.

Consequently, known dual mode Bluetooth/CDMA devices may not be completely adequate for all users due to their high rate of power consumption.

SUMMARY

Broadly, one embodiment of the present invention concerns a method for synchronizing wakeup processes for a Bluetooth module with wakeup processes for a wireless module in a dual mode Bluetooth/wireless mobile unit, and particularly, so that any Bluetooth scanning wakeup processes do not undergo any scanning frequency changes. Initially, the Bluetooth and wireless modules separately schedule respective wakeup processes, starting with a next planned Bluetooth wakeup time and a next planned wireless wakeup time, respectively. If the next planned wireless wakeup time is earlier than a next Bluetooth planned wakeup time, the Bluetooth module takes certain synchronization actions. If in a scan mode such as page scan or inquiry scan, and the next change of the Bluetooth scanning frequency is scheduled to occur after the next planned wireless wakeup time, the Bluetooth module advances its clock so that the scanning frequency change occurs substantially at the next wireless wakeup time. Additionally, whether or not the Bluetooth is in a scan mode, the Bluetooth module reschedules the next Bluetooth wakeup process to commence substantially at the next wireless wakeup time, accounting for any advancement of the Bluetooth clock.

The present invention offers a number of different advantages. Chiefly, power is conserved by advancing the Bluetooth clock, since this prevents any changes to the (page/inquiry scan mode) scanning frequency during the associated Bluetooth wakeup process. Namely, this permits components of the Bluetooth module to remain in a deactivated state during the wakeup/scanning process, instead of attending to change the scanning frequency. Additional power is conserved because the Bluetooth and wireless wakeup times are synchronized so that their respective wakeup processes coincide. The invention also provides a number of other advantages and benefits, which should be apparent from the following description of the invention.

DETAILED DESCRIPTION

Introduction

The nature, objectives, and advantages of the invention will become more apparent to those skilled in the art after considering the following detailed description in connection with the accompanying drawings.

The present invention is generally directed to the reduction of power consumption in a mobile unit with dual mode Bluetooth/wireless operation. And, although the invention is described with respect to specific embodiments, the principles of the invention as defined by the claims appended herein may be applied beyond the embodiments of the description described specifically herein. Moreover, certain details have been omitted to avoid obscuring the inventive aspects of the invention. The specific details not described in the present application are within the knowledge of a person of ordinary skill in the art having the benefit of this disclosure.

The drawings in the present application and their accompanying detailed description are directed to examples of different embodiments of the invention. To maintain brevity, other embodiments of the invention that use the principles of the present invention are not specifically described in the present application and are not specifically illustrated by the present drawings. The word "exemplary" is used exclusively herein to mean "serving as an example, instance, or illustration." Any embodiment described herein as "exemplary" is not necessarily to be construed as preferred or advantageous over other embodiments.

Wireless Communication System

Figure 1:
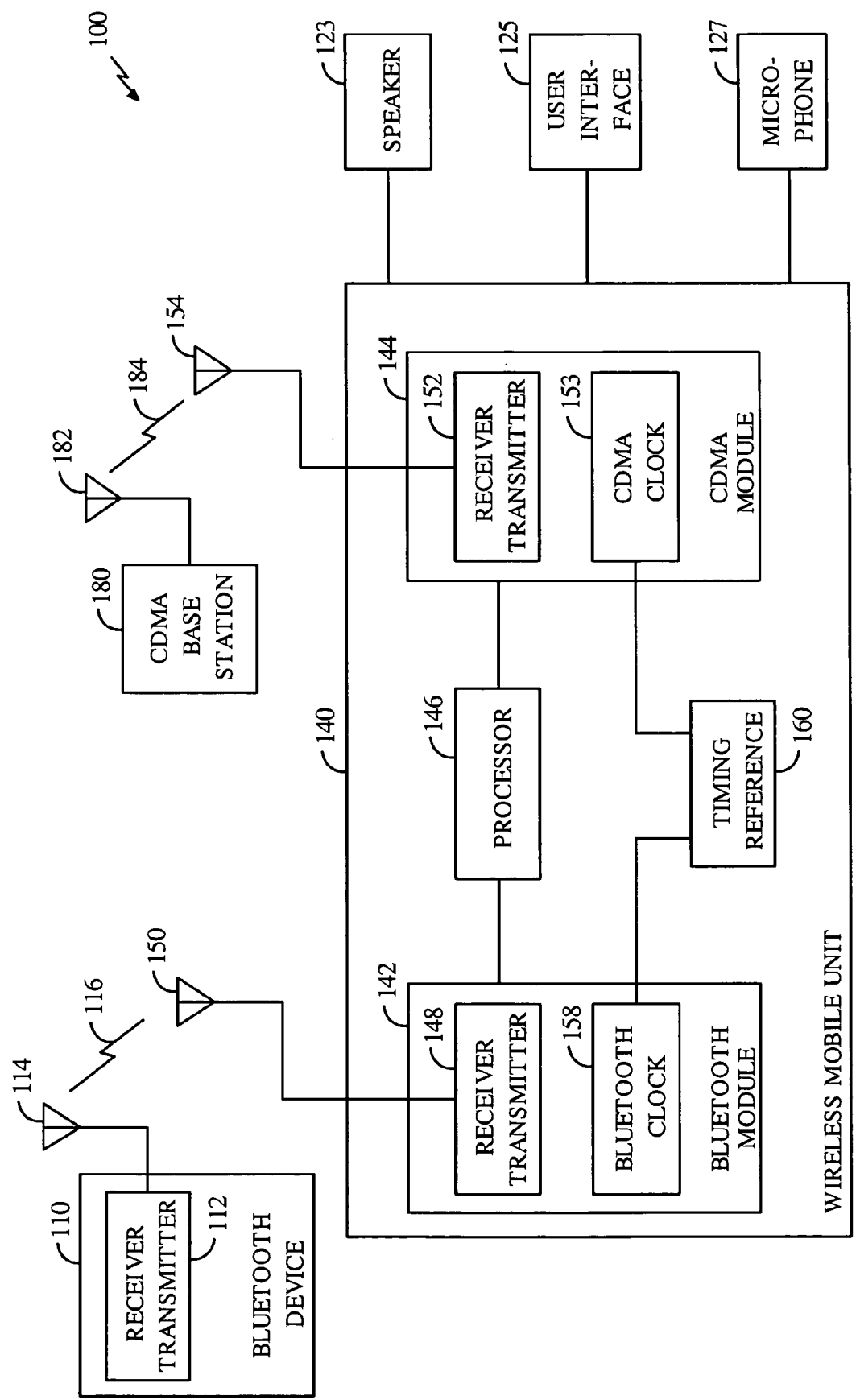
FIG. 1 is a block diagram of an exemplary wireless communication system that includes a dual mode Bluetooth/CDMA mobile unit.

FIG. 1 illustrates an exemplary wireless communication system 100 in accordance with one embodiment of the invention. Without any intended limitation, the wireless communication system 100 is exemplified by components of a dual mode Bluetooth/CDMA mobile unit. In addition to CDMA, the principles of the invention may additionally be applied to other wireless communications systems, to the extent that there are relevant sleep cycles, wakeup processes, etc. Some examples include technologies such as GSM, GPRS, TDMA, WCDMA, HDR, etc.

For consideration in the specific embodiment that utilizes CDMA as illustrated, the general principles of CDMA communication systems, and in particular the general principles for generation of spread spectrum signals for transmission over a communication channel are described in U.S. Pat. No. 4,901,307 entitled "Spread Spectrum Multiple Access Communication System Using Satellite or Terrestrial Repeaters" and assigned to QUALCOMM INC. The disclosure in the '307 patent is hereby fully incorporated by reference into the present application. Moreover, U.S. Pat. No. 5,103,459 entitled "System and Method for Generating Signal Waveforms in a CDMA Wireless Telephone System" and assigned to the QUALCOMM INC. discloses principles related to PN spreading, Walsh covering, and techniques to generate CDMA spread spectrum communication signals. The disclosure of the '459 patent is also hereby fully incorporated by reference into the present application. Further, time multiplexing of data and various principles related to "high data rate" communication systems are disclosed in U.S. patent application Ser. No. 08/963,386 entitled "Method and Apparatus for High Rate Packet Data Transmission," filed on Nov. 3, 1997, now U.S. Pat. No. 6,574,211, issued Jun. 3, 2003 to Padovani et al., and assigned to QUALCOMM INC. The disclosure of the '386 application is also hereby fully incorporated by reference into the present application.

As shown in FIG. 1, the wireless communication system 100 comprises a Bluetooth device 110, wireless mobile unit 140, and CDMA base station 180. Bluetooth device 110 comprises any Bluetooth-enabled device, for example, a laptop computer equipped with Bluetooth components. Bluetooth device 110 is configured to communicate with other Bluetooth-enabled devices utilizing its receiver/transmitter 112 and antenna 114.

The wireless mobile unit 140 may be implemented by various devices, such as a Bluetooth-enabled CDMA cell phone in the present embodiment. As such, wireless mobile unit 140 comprises both Bluetooth and CDMA components, namely, Bluetooth module 142 and CDMA module 144, respectively. Bluetooth module 142 and CDMA module 144 are coupled to processor 146, which, in one embodiment, is configured to monitor and direct the wakeup/sleep cycles of Bluetooth module 142 in its various sleep modes and the wakeup/idle cycles of CDMA module 144 in idle mode. Wireless mobile unit 140 also includes a timing reference 160 to provide Bluetooth module 142 and CDMA module 144 with a common clock signal or other periodic reference.

Bluetooth module 142, hereinafter referred to as "module 142," engages in various sleep modes, which constitute reduced power operating modes. When it is not already communicating with another Bluetooth device, the module 142 may engage in sleep modes including "page scan" or "inquiry scan." With page scan, the module 142 conducts frequency scanning scan to determine whether other nearby Bluetooth devices, having previously discovered the module 142, are now attempting to establish a connection with the module 142. With inquiry scan, the module 142 conducts frequency scanning to allow other Bluetooth devices to discover the module 142's presence. The terms "scanning" or "wakeup scanning" are utilized to collectively refer to the wakeup processes of page scan, inquiry scan, and other such operations where the Bluetooth module is not already in established communication with another Bluetooth device.

After communications with another Bluetooth device has been initiated, the module 142 may engage in other sleep modes including a "hold mode" or "sniff mode" or "park mode." Hold mode refers to a one-time event in which the module 142 and another Bluetooth device agree not to communicate with each other for a set length of time. In sniff mode, the module 142 engages in brief communication with another Bluetooth device for a set amount of time at a mutually agreed interval, during which either device can send signals including data. Sniff mode continues until either device wishes to exit this mode of operation. Park mode is like sniff mode, with one difference being that data cannot be exchanged. The processes of waking up and completing page scan, inquiry scan, hold, sniff, or park mode tasks are collectively referred to herein as "Bluetooth wakeup processes."

The following describes the page scan mode in greater detail. When the Bluetooth device 110 is not actively communicating in a Bluetooth network, one operational mode of the Bluetooth module 142 is a page scan mode in which the module 142 periodically "wakes up" from a reduced power setting to determine whether other Bluetooth-enabled devices such as 110 are trying to establish a connection with the module 142. Scanning the surrounding environment for other Bluetooth-enabled devices seeking to establish a connection is done in a manner known in the art and may involve, for example, the transmission, reception and processing of specific paging signals. The specific process of waking up, page scanning, and then shutting down performed by Bluetooth module 142 is also referred to as a "Bluetooth page scan wakeup process" in the present application, regardless of whether the implementation employs paging signals as such or another type of communication. In the case of inquiry scan, the operations are similar, but the module 142 scans different frequencies to determine whether inquiry requests from other devices are occurring, to which the module 142 should respond in order to allow those other devices to discover the module 142. The process of waking up, inquiry scanning, and then shutting down is referred to as a "Bluetooth inquiry scan wakeup process." During the Bluetooth wakeup/scanning process, some components of the wireless mobile unit 140 (such as any applicable computing resources of the processor 146) may be temporarily deactivated so as to "sleep" during scanning.

Bluetooth module 142 includes a Bluetooth receiver/transmitter 148 connected to Bluetooth antenna 150. In the page scan mode, the Bluetooth module 142 utilizes Bluetooth receiver/transmitter 148 and Bluetooth antenna 150. In the present embodiment, Bluetooth module 142 is configured to perform a Bluetooth page scanning wakeup process twice every 1.28 seconds. However, those skilled in the art will appreciate that Bluetooth module 142 can be configured to perform a Bluetooth page scanning wakeup process at other intervals, for example every 1.28 seconds, every 0.32 seconds, or every 0.16 seconds. Further, it is appreciated that certain Bluetooth specifications may require that Bluetooth module 142 perform its Bluetooth page scanning wakeup process, for example, at least once every 1.28 seconds, every 2.56 seconds, or any other interval required by the particular Bluetooth specification. Bluetooth device 110 and Bluetooth module 142 communicate with each other via Bluetooth airlink 116 using their respective receiver/transmitter and antenna elements.

Bluetooth module 142 further includes a Bluetooth clock 158, hereinafter referred to as "clock 158." In one embodiment, clock 158 is the internal clock for Bluetooth module 142. Clock 158 may comprise, for example, a 28-bit counter that tracks a "current Bluetooth time" and relays the current Bluetooth time to processor 146. The clock 158 is set whenever the module 142 communicates with another Bluetooth device. Namely, the module 142 resets the clock according to a time signal from another Bluetooth device operating in the role of "master." Whether or not the module 142 is not communicating with another Bluetooth device, advancement of the clock 158 is driven by the time reference 160. In the illustrated embodiment, when the lower twelve bits of the clock 158 roll over while the module is in the page (or inquiry) scan mode, this causes a change in the page (or inquiry) scanning frequency, i.e., from one page (or inquiry) scanning channel to the next.

Referring now to the CDMA module 144, one component is a CDMA receiver/transmitter 152, which is connected to CDMA antenna 154. CDMA module 144 utilizes CDMA receiver/transmitter 152 and CDMA antenna 154 to communicate in a CDMA network, and more particularly with CDMA base station 180, via CDMA airlink 184. CDMA module 144 communicates with CDMA base station 180 by utilizing CDMA receiver/transmitter 152 and CDMA antenna 154 to transmit and receive signals. At the same time, CDMA base station 180 utilizes base station antenna 182 to receive signals from, and transmit signals to, CDMA module 144. Communication between CDMA module 144 and CDMA base station 180 occurs in a manner known in the art.

When wireless mobile unit 140 is not actively communicating in the CDMA network, CDMA module 144 assumes an "idle" mode. CDMA module 144 engages in a number of tasks while it is in idle mode, including the task of synchronizing its clock with CDMA system time. As is known in the art, the robustness of communication in a CDMA network depends in part on the time-synchronization of each component in the CDMA network, including mobile units, base stations, base station controllers, etc.

In order to synchronize with CDMA system time, CDMA module 144 utilizes transmitter/receiver 152 and CDMA antenna 154 to receive a pilot signal transmitted by CDMA base station 180. The received pilot signal is processed and the current CDMA system time determined from the data contained in the pilot signal. The processing of the pilot signal by CDMA module 144 and the determination of the current CDMA system time therefrom are done in a manner known in the art. In the present embodiment, the current time of the CDMA module 144 is set to the CDMA system time derived from the pilot signal. CDMA current time is therefore the same as CDMA system time. The CDMA clock 153 tracks the CDMA current time. CDMA current time is the same as CDMA system time. The timing reference 160 is used to advance the CDMA clock 153, but every time the CDMA clock receives a pilot signal, it re-aligns with CDMA system time. Advancement of the CDMA clock 153, having been set according to a pilot signal, is driven by the timing reference 160.

Thus, timing reference 160 provides CDMA module 144 and Bluetooth module 142 with a common timing reference signal, but the absolute values of the current Bluetooth module time and the current CDMA module time may be different. In a different embodiment, timing reference 160 provides CDMA module 144 and Bluetooth module 142 with a common source of time such that the "current" times for both modules are the same. The process of waking up, synchronizing with base station 180 and shutting down performed by CDMA module 144 is referred to as a "CDMA wakeup process."

The wakeup frequency of the CDMA module 144 is governed by the SCI as set by either the phone or the base station in a manner known in the art. For example, if the SCI for CDMA module 144 is zero, then CDMA module 144 performs a CDMA wakeup process every 1.28 seconds. As a different example, if the SCI is set at one, the CDMA wakeup process is performed every 2.56 seconds; if the SCI is set at two, the CDMA wakeup process is performed every 5.12 seconds. Thus, the lower the SCI, the more frequently CDMA module 144 performs its CDMA wakeup process. In the present embodiment, the SCI for CDMA module 144 is set at zero, so that CDMA module 144 performs a CDMA wakeup process every 1.28 seconds.

Processor 146 uses the information it receives from Bluetooth clock 158 and from CDMA module 144 in order to synchronize the wakeup schedule of Bluetooth module 142 with the wakeup schedule of CDMA module 144. In the present embodiment, in order to synchronize the two wakeup schedules, processor 146 determines how much time remains until the next wakeup process is scheduled for both Bluetooth module 142 and CDMA module 144.

In one embodiment, processor 146 is configured to determine the next planned Bluetooth and CDMA wakeup times based on how frequently the Bluetooth wakeup processes and CDMA wakeup processes, respectively, are set to be performed. As stated above, Bluetooth module 142 can be set to perform a Bluetooth wakeup process at different intervals or frequency, such as once every 0.64 seconds, and CDMA module 144 can be set to perform a CDMA wakeup process every 1.28 seconds, every 2.56 seconds, or every 5.12 seconds, depending on its SCI. In one embodiment, processor 146 determines the next planned Bluetooth wakeup time by monitoring when Bluetooth module 142 last performed a Bluetooth wakeup process and then calculating when the next Bluetooth wakeup process is to be performed. Thus, as an illustration, if processor 146 determines that Bluetooth module 142 last performed a Bluetooth wakeup process at time T, and Bluetooth module 142 is set to perform a Bluetooth wakeup process every 0.64 seconds, then processor 146 calculates The next planned Bluetooth wakeup time to be time T plus 0.64 seconds. Similarly, if processor 146 determines that CDMA module 144 last performed a CDMA wakeup process at time Y, and CDMA module 144 is set to perform a CDMA wakeup process every 1.28 seconds, i.e. its SCI is set at zero, then processor 146 calculates the next planned CDMA wakeup time to be time Y plus 1.28 seconds.

As mentioned above, the Bluetooth module 142 and CDMA module 144 are configured to plan their respective wakeup processes to start at various periodic intervals. One feature of the presently described embodiment is that processor 146 further acts to synchronize the planned wakeup schedule of Bluetooth module 142 to the wakeup schedule of CDMA module 144 by determining when the next Bluetooth wakeup process is to be performed in relation to when the next CDMA wakeup process is to be performed. The times remaining until the respective next scheduled wakeup processes are determined by calculating the time difference between the current time and the time of the next scheduled wakeup processes. For example, the time remaining until the next scheduled CDMA wakeup process is the next planned CDMA wakeup time less the current CDMA module time. If processor 146 determines that the next Bluetooth wakeup process is scheduled to be performed later than the next CDMA wakeup process, processor 146 advances the wakeup schedule of Bluetooth module 142 such that Bluetooth module 142 performs the next Bluetooth wakeup process at the same time CDMA module 144 performs the next CDMA wakeup process. In other words, processor 146 triggers Bluetooth module 142 to perform its next Bluetooth wakeup process at the next planned CDMA wakeup time rather than waiting until the next planned Bluetooth wakeup time. The next Bluetooth wakeup process is therefore synchronized with the next CDMA wakeup process.

Synchronizing the two wakeup schedules reduces the power consumption of wireless mobile unit 140 by sharing the power otherwise required to separately turn on Bluetooth module 142 and CDMA module 144 when they perform their respective wakeup processes.

In an enhancement to the foregoing configuration of the wireless mobile unit 140, the processor 146 may be configured to advance the Bluetooth clock 158 (or take other action as needed to prevent page/inquiry scanning frequency from changing during the next page/inquiry scanning wakeup process). As illustrated, this is done before synchronizing the Bluetooth wakeup schedule to the CDMA wakeup schedule. Namely, the processor 146 advances the clock 158 so that it will roll over at the next CDMA wakeup time (which will also mark the next Bluetooth wakeup time after synchronization). "Rollover" occurs when the least significant twelve bits of the twenty-eight bits of the Bluetooth clock 158 "toggle," that is, pass their maximum number and reset.

Clock advancement in this manner contributes to power conservation, since clock rollover might otherwise require activation of the processor 146 during the Bluetooth module 142's wakeup process. In particular, during page/inquiry scan mode, the Bluetooth module 142 directs the receiver/transmitter 148 to change the Bluetooth frequency being scanned whenever the clock 158 rolls over. Although the act of frequency scanning once begun can be performed with reduced facilities, and namely without involving the processor 146, the act of changing scanning frequencies requires involvement of the processor 146 and hence greater power consumption. Thus, during each page/inquiry scan mode wakeup process the processor 146 can remain largely dormant, while the receiver/transmitter 148 scans a single frequency. Optionally, the processor 146 may advance the clock in the foregoing manner only when circumstances indicate that clock rollover (i.e., page/inquiry mode scanning frequency change) will occur during the next planned Bluetooth page/inquiry mode wakeup process, namely, between the planned CDMA wakeup time and a length of time equal to the Bluetooth page/inquiry mode wakeup process.

The operation of these and other components of the unit 140 are described in greater detail below.

Exemplary Digital Data Processing Apparatus

As mentioned above, data processing entities such as the processor 146 may be implemented in various forms. One example is a digital data processing apparatus, as exemplified by the hardware components and interconnections of the digital data processing apparatus 400, hereinafter referred to as "apparatus 400," of FIG. 4.

The apparatus 400 includes a processor 402, such as a microprocessor, personal computer, workstation, or other processing machine, coupled to a storage 404. In the present example, the storage 404 includes a fast-access storage 406, as well as nonvolatile storage 408. The fast-access storage 406 may comprise random access memory (RAM), and may be used to store the programming instructions executed by the processor 402. The nonvolatile storage 408 may comprise, for example, battery backup RAM, EEPROM, flash PROM, one or more magnetic data storage disks such as a "hard drive," a tape drive, or any other suitable storage device. The apparatus 400 also includes an input/output 410, such as a line, bus, cable, electromagnetic link, or other means for the processor 402 to exchange data with other hardware external to the apparatus 400.

Despite the specific foregoing description, ordinarily skilled artisans (having the benefit of this disclosure) will recognize that the apparatus discussed above may be implemented in a machine of different construction, without departing from the scope of the invention. As a specific example, one of the components 406, 408 may be eliminated; furthermore, the storage 404, 406, and/or 408 may be provided on-board the processor 402, or even provided externally to the apparatus 400.

Logic Circuitry

In contrast to the digital data processing apparatus discussed above, a different embodiment of the invention uses logic circuitry instead of computer-executed instructions to implement processing entities such as the processor 146. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

Operation—Introduction

Having described the structural features of the system 100, an operational aspect of the present invention will now be described. As mentioned above, the operational aspect of the invention generally involves synchronizing a planned wakeup process for a Bluetooth module with a planned wakeup process for a CDMA module in a wireless mobile unit, and particularly, in such a way that any Bluetooth page/inquiry scanning wakeup processes do not undergo any scanning frequency changes.

Although the present invention has broad applicability to the power-efficient synchronization of different wireless communication modules, the specifics of the structure that has been described is particularly suited for Bluetooth and CDMA type communications, and the explanation that follows will emphasize such an application of the invention without any intended limitation.

Operation—Signal-Bearing Media

Figure 4:
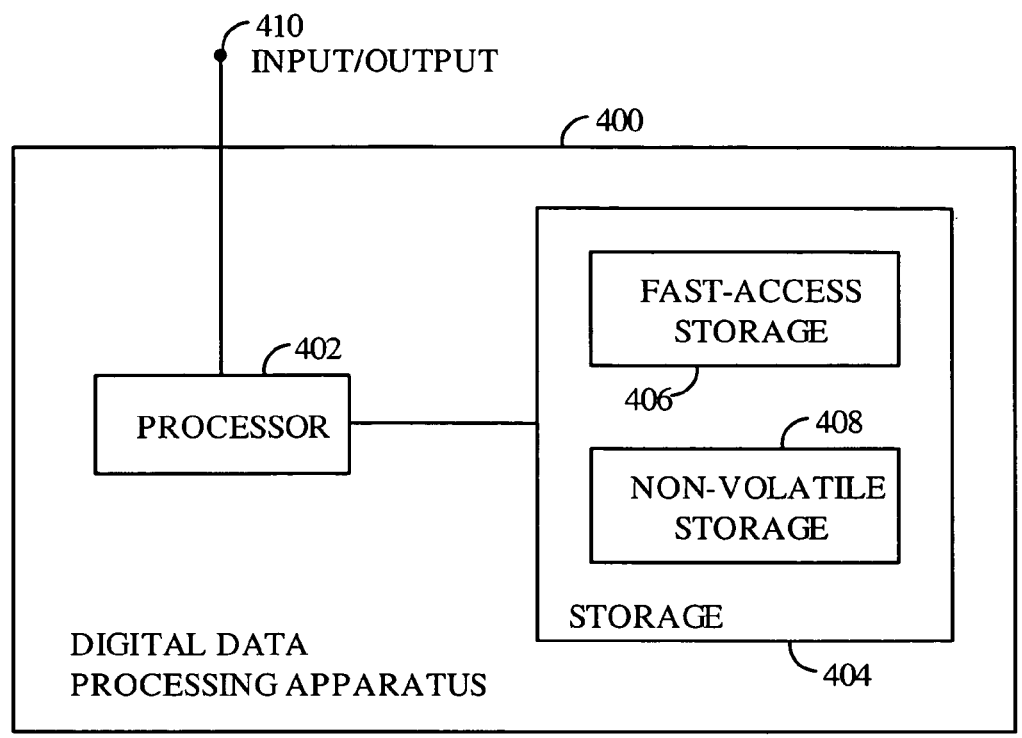
FIG. 4 is a block diagram of an exemplary digital data processing machine.
Figure 5:
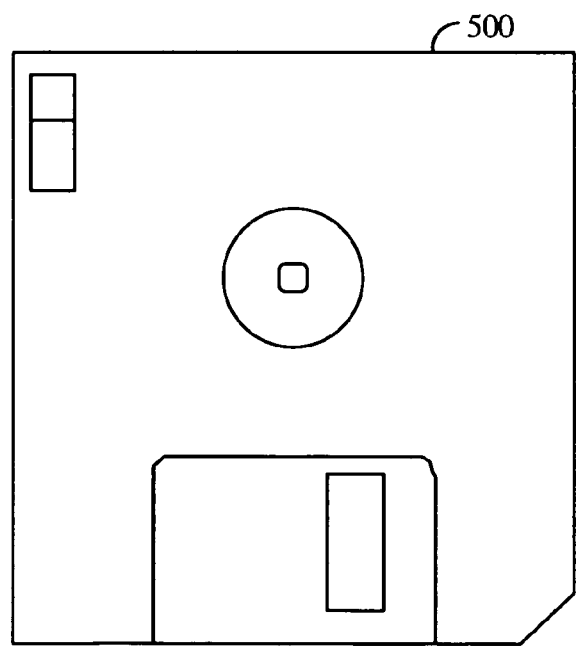
FIG. 5 is a simplified diagram of an exemplary signal bearing medium.

Wherever the functionality of one or more components is implemented using one or more machine-executed program sequences, these sequences may be embodied in various forms of signal-bearing media. In the context of FIG. 4, such a signal-bearing media may comprise, for example, the storage 404 or another signal-bearing media, such as a magnetic data storage diskette 500 (FIG. 5), directly or indirectly accessible by the processor 402. Whether contained in the storage 406, diskette 500, or elsewhere, the instructions may be stored on a variety of machine-readable data storage media. Some examples include direct access storage (e.g., a conventional "hard drive," redundant array of inexpensive disks (RAID), or another direct access storage device (DASD)), serial-access storage such as magnetic or optical tape, electronic non-volatile memory (e.g., ROM, EPROM, flash PROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Operation—Logic Circuitry

In contrast to the signal-bearing medium discussed above, some or all of the invention's functionality may be implemented using logic circuitry, instead of using a processor to execute instructions. Such logic circuitry is therefore configured to perform operations to carry out this functionality. The logic circuitry may be implemented using many different types of circuitry, as discussed above.

Operation—Graphical Description

Figure 2A:
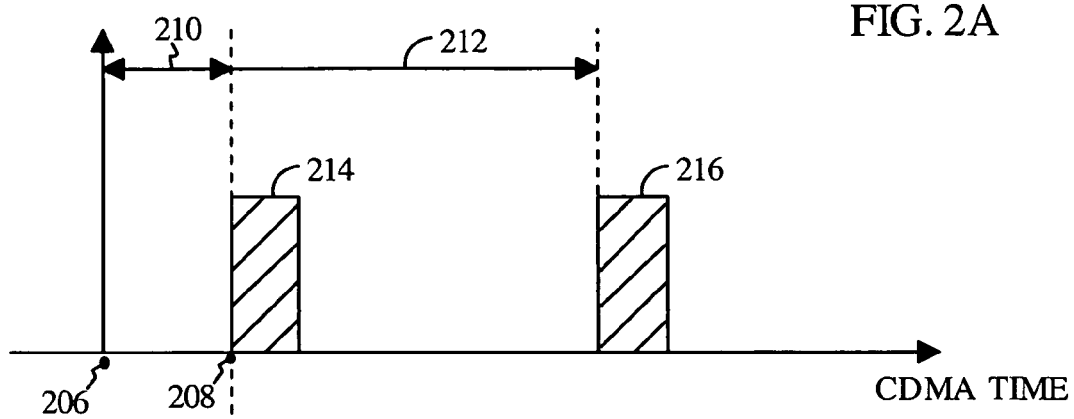
FIG. 2A–2C are graphs illustrating the synchronization of wakeup schedules of a dual mode Bluetooth/CDMA mobile unit.
Figure 2B:
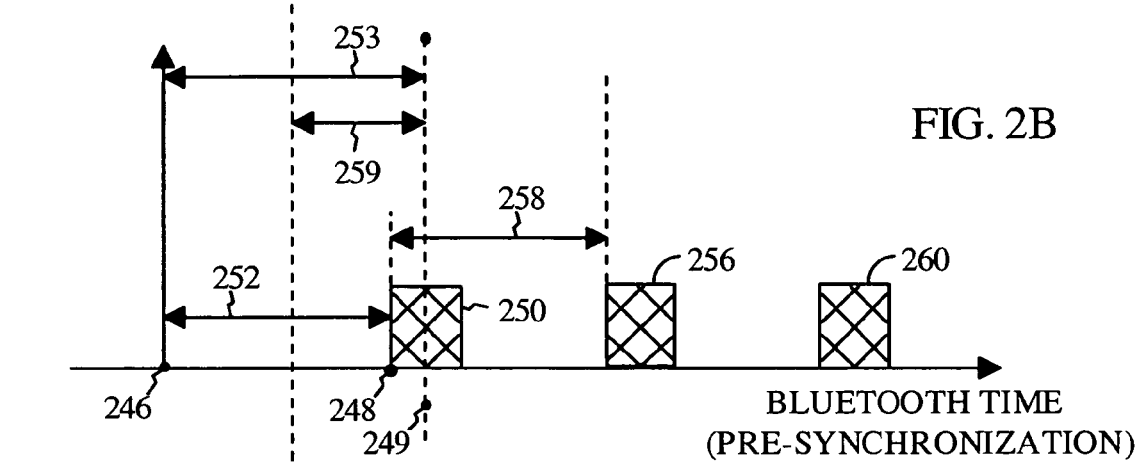
Figure 2C:
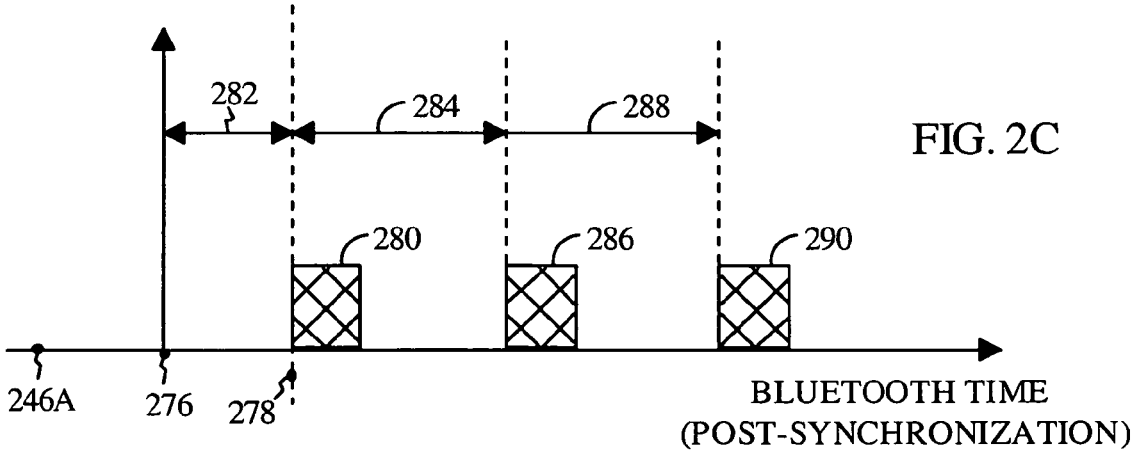

FIGS. 2A–2C graphically aid the illustration of one exemplary technique for synchronizing the wakeup schedule of a Bluetooth module to the wakeup schedule of a CDMA module in a wireless mobile unit such as, for example, wireless mobile unit 140 of FIG. 1. Without any intended limitation, references are made to the particular wireless mobile unit 140 in order to facilitate discussion.

FIG. 2A illustrates a time sequence of the wakeup schedule of the CDMA module 144 while in idle mode. The vertical axis shows the on/off state of CDMA module 144, while the horizontal axis corresponds to time. Namely, when the CDMA module is "on" (214, 216) it is performing its CDMA wakeup process, including synchronization and any other CDMA related tasks. As the CDMA module 144 is in its idle mode throughout FIG. 2A, the CDMA module is not being activated to conduct wireless subscriber communications during the illustrated time; in such event, there would be no need to conduct any wakeup process.

The CDMA system time at the current instant (according to the CDMA clock 153) is shown by 206; this time derived from a pilot signal received from a base station as discussed above. CDMA module 144 is in idle mode at the current CDMA time 206 and not performing a CDMA wakeup process, i.e. CDMA module 144 is "off." At the next planned CDMA wakeup time 208, CDMA module 244 will turn on and begins CDMA wakeup process 214. A time interval 210 between the current CDMA module time 206 and the next planned CDMA wakeup time 208 represents the time period between the current CDMA time and the time when the next CDMA wakeup process is to be performed. Interval 212 represents the time between the start of CDMA wakeup process 214 and the start of the subsequent CDMA wakeup process 216. Interval 212 may, for example, be 1.28 seconds if the module 144's SCI is set at zero; this means that CDMA module 144 is set to perform a CDMA wakeup process every 1.28 seconds.

FIG. 2B shows a time sequence of a sleep mode wakeup schedule for the Bluetooth module 142, before being synchronized to the CDMA module's wakeup schedule. The vertical axis shows the on/off state of Bluetooth module 142, while the horizontal axis corresponds to time. Namely, when the Bluetooth module is "on" (250, 256, 260) it is performing its Bluetooth sleep mode wakeup process, such as page scan, inquiry scan, hold, sniff, park, or other sleep mode tasks. To illustrate a specific example, a series of page scanning wakeup processes is discussed. Thus, in this example, the intervals 250, 256, 260 represent scanning for other nearby Bluetooth devices. The current Bluetooth time (according to the Bluetooth clock 158) at the current instant is shown by 246. At this time, the Bluetooth module 142 is "off" and not performing any Bluetooth wakeup process. At the next planned Bluetooth wakeup time 248, Bluetooth module 142 will turn on and begin Bluetooth wakeup process 250. Between the current Bluetooth time 246 and the next planned Bluetooth wakeup time there is a time interval 252. Interval 252 is the length of time between current Bluetooth time 246 and the next planned Bluetooth wakeup time 248. The Bluetooth module 142 repeats its wakeup process at regular intervals of 258 following the time 248, as shown by 256, 260. If, for example, Bluetooth module 142 is set to perform a Bluetooth wakeup process every 0.64 seconds, then the interval 258 and subsequent such intervals are equal to 0.64 seconds.

In comparing FIGS. 2A–2B, the interval 252 is greater than interval 210. In other words, the next planned Bluetooth wakeup process 250 will occur after the next planned CDMA wakeup process 214. This causes a significant drain on the power supply of wireless mobile unit 140, as it requires the Bluetooth module 142 and CDMA module 144 to be turned on separately to perform their respective wakeup processes.

FIG. 2C shows a post-synchronization time sequence for the wakeup schedule of Bluetooth module 142. The vertical axis shows the on/off state of Bluetooth module 142, and the horizontal axis corresponds to time. In FIG. 2B, the time of Bluetooth clock 258 rollover (i.e., page scan mode frequency change) is marked by 249. A time interval 253 is measured between the current Bluetooth time 246 and rollover time 249. Another interval 259 is measured between the next planned CDMA wakeup time 208 and the rollover time 249. To ensure that rollover coincides with time 208 (only required if the wakeup processes 250, 256, 260 constitute page or inquiry scan mode wakeup processes), and anticipating that the start of the Bluetooth wakeup process 250 will be synchronized with the start of the CDMA wakeup process 214, the Bluetooth clock 258 is therefore advanced by the amount 259. The amount 259 may be calculated in various ways, such as (1) by subtracting 210 from 253, or (2) by reducing the time 249 by the current Bluetooth clock 246 (to compute 253) and further reducing this by the difference between 208 and 206 (namely 210). The current Bluetooth time after advancing the clock 158 by the amount 259 is shown by 276 of FIG. 2C. The time 276 is referred to as the post-advancement current time. The value of the clock 158 at pre-clock-advancement time 246 (FIG. 2B) is therefore represented by 246a (FIG. 2C).

As shown in FIG. 2C, the next scheduled Bluetooth wakeup process has been "rescheduled" from 250 to 280 as a result of synchronization and is now set to be performed at the synchronized time 278. Thus, rather than having Bluetooth module 142 perform the next Bluetooth wakeup process at time 248 as shown in FIG. 2B, the outcome of synchronizing the wakeup schedule of Bluetooth module 142 to the wakeup schedule of CDMA module 144 is a temporal shift of the next Bluetooth wakeup process 250, such that the resynchronized next Bluetooth wakeup process 280 is performed at the same time as the next CDMA wakeup process 214.

More particularly, synchronization requires that the next Bluetooth wakeup time 278 be reset to a time interval of 259 plus 210 in the future from the old Bluetooth time 277, or a time interval 210 in the future from the post-advancement current time 276. This leads to the concurrent performance of Bluetooth wakeup process 280 and CDMA wakeup process 214 at times 278, 208, respectively. In the absence of Bluetooth clock advancement, the next planned Bluetooth wakeup time is scheduled for a time interval 282 (equal to 210) in the future, as measured from the un-advanced Bluetooth current time 246.

The foregoing synchronization of Bluetooth wakeup process 280 with CDMA wakeup process 214 means that Bluetooth module 142 and CDMA module 144 can be powered on at the same time to perform their wakeup processes, resulting in a significant reduction in power consumption by wireless mobile unit 140. Also, by advancing the Bluetooth clock 158 to ensure that rollover occurs at 278 and not during 280, further power is conserved because the page/inquiry scanning frequency will not be able to change during 280.

Bluetooth wakeup process 286 follows Bluetooth wakeup process 280 after a length of time 284 has elapsed, and Bluetooth wakeup process 290 follows after another elapsed time 288. Bluetooth wakeup processes 286 and 290 of FIG. 2C represent Bluetooth wakeup processes 256 and 260 of FIG. 2B, shifted forward as a result of the synchronization of Bluetooth wakeup process 280 with CDMA wakeup process 214.

Operation—Step by Step Sequence

Figure 3:
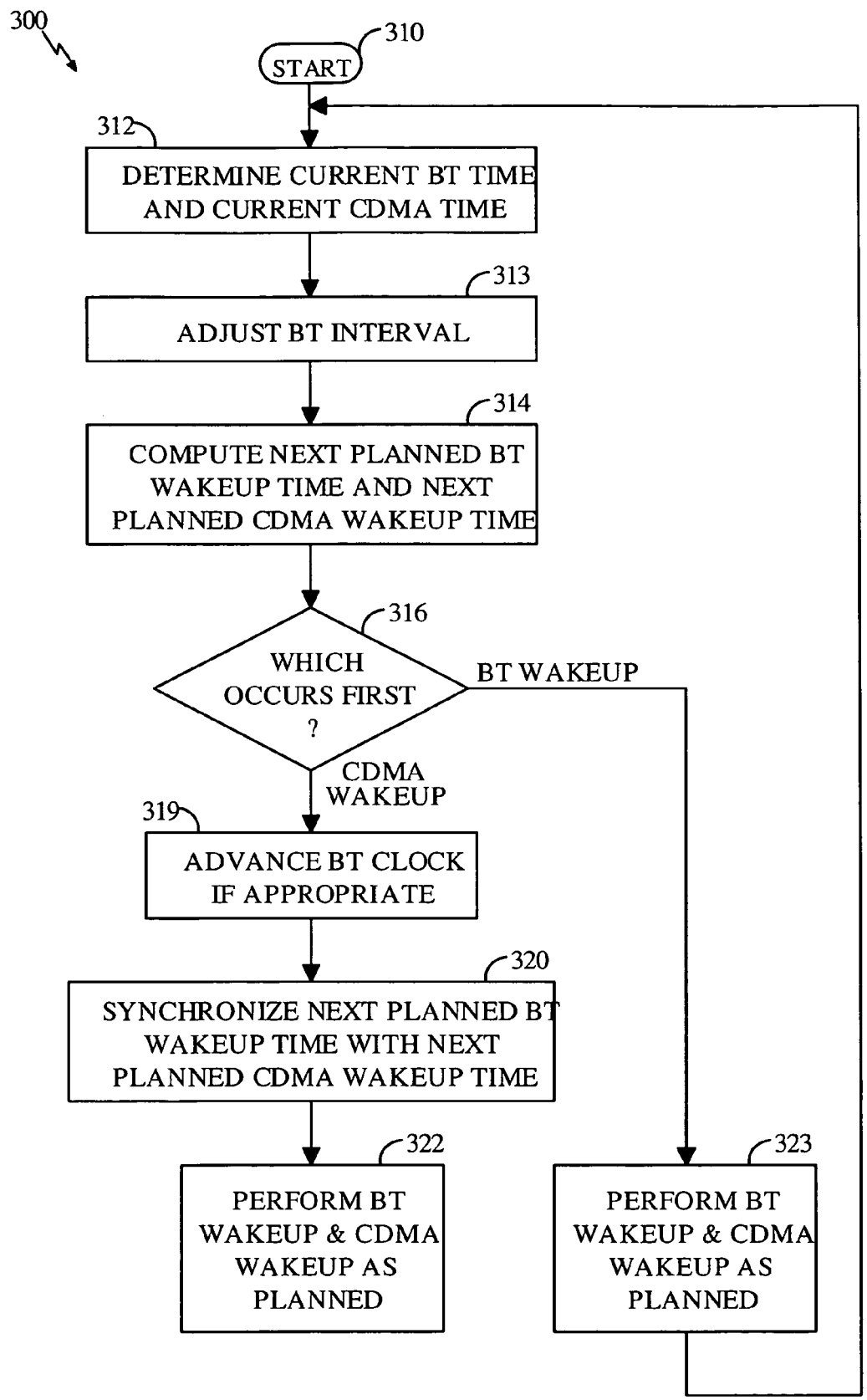
FIG. 3 is a flowchart of a process for synchronizing the wakeup schedules of a Bluetooth module and a CDMA module of a dual mode Bluetooth/CDMA mobile unit.

FIG. 3 shows a sequence 300 to synchronize wakeup schedules of a Bluetooth module and a CDMA module in a wireless mobile unit. For ease of explanation, but without any intended limitation, the example of FIG. 3 is described in the context of the hardware described above in FIG. 1.

The steps 300 are initiated in step 310, when, for example, wireless mobile unit 140 is not communicating in a Bluetooth network and also not communicating in a CDMA network. In other words, the process begins when the process 146 detects that the Bluetooth module 142 is in sleep mode and CDMA module 144 is idle.

At step 312, the processor 146 determines the current Bluetooth time and the current CDMA time. For example, to determine the current Bluetooth time, the processor 146 may consult the clock 158. To determine the current CDMA time, the processor 146 may consult the clock 153, or trigger the CDMA module 144 to determine time by using data in a CDMA pilot signal transmitted by a base station and received by CDMA module 144. In one embodiment, timing reference 160 provides CDMA module 144 and Bluetooth module 142 with a common source of time such that the "current" time for both modules are the same in the absence of overriding, corrective time signals from external sources.

In step 313, the processor 146 examines the interval between successive planned CDMA wakeup processes (e.g., between 214, 216) and the interval between successive planned Bluetooth wakeup processes (e.g., between 250, 256). In the case of CDMA, this is dictated by the established SCI; in the case of Bluetooth, this interval is dictated by programming of the Bluetooth module 142 or by the requirement of communication with another Bluetooth module. After examining these intervals, the processor 146 adjusts the Bluetooth wakeup interval so that the CDMA wakeup interval is an integer multiple of the Bluetooth wakeup interval, or so that the Bluetooth wakeup interval is an integer multiple of the CDMA wakeup interval. In this way, after the first Bluetooth wakeup process has been synchronized to the next CDMA wakeup process (as discussed below), subsequent Bluetooth and CDMA wakeup processes will not occur out-of-synch with each other, except to the extent one type occurs more frequently. The strategy implemented by the processor 146 in changing the Bluetooth wakeup interval depends upon the desired frequency of repeating the respective CDMA and Bluetooth wakeup processes, namely, the SCI and other Bluetooth requirements as discussed above. Subsequent performance of step 313 may be skipped in the event that step 316 leads to step 323, ultimately returning to step 313 via step 312.

In step 314, the processor 146 identifies the next planned Bluetooth wakeup time and the next planned CDMA wakeup time. The next planned Bluetooth wakeup time is determined based on the time that the preceding Bluetooth wakeup process was performed by Bluetooth module 142. The next planned Bluetooth wakeup time is also a function of how often Bluetooth wakeup processes are to be performed, for example, once every 1.28 seconds, every 0.64 seconds, every 0.32 seconds, etc. In one embodiment, processor 146 monitors the time of the preceding Bluetooth wakeup process and calculates the next planned Bluetooth wakeup time by adding, for example, 1.28 seconds, 0.64 seconds or 0.32 seconds to the time of the last Bluetooth wakeup process, depending on how often Bluetooth wakeup processes are set to be performed. In a similar fashion, the processor 146 also calculates the next planned CDMA wakeup time in step 314. For example, processor 146 may compute the next planned CDMA wakeup time by monitoring the last CDMA wakeup time and then adding, for example, 1.28, 2.56, or 5.12 seconds, depending on the SCI set for CDMA module 144.

In step 316, the processor 146 determines which is first—the next planned CDMA wakeup time 208 or the next planned Bluetooth wakeup time 248. Namely, if the current Bluetooth time 246 plus the interval 210 between the next planned CDMA time 208 and the current CDMA time 206 is greater than time 248, this indicates that the next CDMA wakeup process is scheduled to be performed by CDMA module 144 after the next Bluetooth wakeup process is scheduled to be performed by Bluetooth module 142. In such an instance, there is no advantage to be realized by rescheduling the next planned Bluetooth wakeup time any earlier, since it is already earlier than the next planned CDMA wakeup time. In this case, step 316 advances to step 323, where the Bluetooth module 142 and CDMA module 144 wait and then perform their respective wakeup processes at their scheduled times as discussed below. On the other hand, if step 316 finds that the next planned Bluetooth wakeup time is after the next planned CDMA wakeup time (as illustrated in FIGS. 2A–2B), then the process 300 proceeds to step 319.

In step 319, the processor 146 advances the Bluetooth clock 158 to prevent rollover from possibly occurring during the Bluetooth wakeup process 250 (to be rescheduled for 280). This is done by advancing the Bluetooth clock 158 by the amount of time 259. Optionally, adjustment of the clock 158 may be performed conditionally, that is, only if rollover would otherwise occur during the Bluetooth wakeup process 280. A simpler option, which does not need to consider the length of the process 280, is to limit clock advancement to cases where Bluetooth clock rollover would occur after the time 208, therefore assuming that the worst case scenario that rollover will occur during the process 280.

In the illustrated embodiment, step 319 is only performed if appropriate. Namely, step 319 is only performed if the Bluetooth module 142 is in the page scan mode, inquiry scan mode, or another sleep mode in which communications with another Bluetooth device have not been established (and Bluetooth time has not been established by reference to signals from another Bluetooth device). In the hold, sniff, or park modes, resetting of the Bluetooth clock 158 is skipped because the clock is automatically set according to the Bluetooth master device, and cannot be freely advanced. In addition, step 319 may be skipped during the second and each subsequent time of progressing through the sequence 300 during the same sleep mode (via steps 316, 323, 312, etc.), assuming that the first time of performing step 319 already had the effect of setting the Bluetooth clock so that rollover will not occur during future wakeup processes.

At step 320, processor 146 synchronizes the next planned Bluetooth wakeup time 248 with the next planned CDMA wakeup time 208, namely, rescheduling Bluetooth wakeup to occur at 278 rather than 248. In other words, since the processor 146 determined at step 316 that the next CDMA wakeup process 214 is scheduled to be performed before the next Bluetooth wakeup process 250 processor 146 in step 320 "reschedules" the next Bluetooth wakeup process 250 to 280, which will be performed simultaneously with the next CDMA wakeup process 214.

At step 322, Bluetooth module 142 waits and then performs the Bluetooth wakeup process 280 when the next planned Bluetooth wakeup time 278 is reached. In step 322, the CDMA module 144 also performs its CDMA wakeup process. Here, Bluetooth module 142 and CDMA module 144 perform their wakeup processes at the same time, significantly reducing the power consumption of wireless mobile unit 140 since the two modules are powered up simultaneously. Advantageously, in the case of page scan mode or inquiry scan mode, step 319 was performed previously in order to reschedule clock rollover to occur at 278, and thus the processor 146 may sleep through the Bluetooth wakeup process 280 while the Bluetooth module 142 scans for other Bluetooth devices, thereby contributing to power conservation in the unit 140. The routine 300 ends in step 322, wherein the CDMA and Bluetooth wakeup processes (now synchronized) repeat as scheduled until one or both of the modules 142, 144 is awakened.

As mentioned above, step 316 advances to step 323 if the next planned Bluetooth wakeup process is already scheduled to occur earlier than the next planned CDMA wakeup process. In this case, there is no advantage to be realized by rescheduling the next planned Bluetooth wakeup time any earlier, since it is already earlier than the next planned CDMA wakeup time. Thus, step 323 is performed, wherein the Bluetooth module 142 and CDMA module 144 wait and then perform their respective wakeup processes at their scheduled times in the same manner as step 322. After step 323, the routine 300 returns to step 312 to evaluate the next planned Bluetooth and CDMA wakeup processes. The process 300 continues until, for example, Bluetooth module 142 exits sleep mode or CDMA module 144 exits idle mode.

Other Embodiments

The previous description of various disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Those of ordinarily skill in the art will recognize that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill will further appreciate that the various illustrative logical blocks, modules, circuits, and algorithm steps described in connection with the embodiments disclosed herein may be implemented as electronic hardware, computer software, or combinations of both. To illustrate some exemplary embodiments, functional aspects of the invention have been described in conjunction with various blocks, modules, circuits, and steps. Whether such functionality is implemented as hardware, software, or both depends upon the particular application and design constraints imposed on the overall system. Skilled artisans may implement the described functionality in varying ways for each particular application, but such implementation decisions should not be interpreted as causing a departure from the scope of the present invention.

The invention claimed is:

1. A signal-bearing medium tangibly embodying a program of machine-readable instructions executable by a digital data processing machine to perform operations to synchronize idle mode wakeup times for a Bluetooth module and a wireless module in a dual mode Bluetooth/wireless unit, the operations comprising:

determining whether a next planned wireless module wakeup time is earlier than a next planned Bluetooth module wakeup time;

if the next planned wireless module wakeup time is earlier than the next planned Bluetooth module wakeup time, performing operations comprising:

determining whether a next Bluetooth scanning frequency change is scheduled to occur after the next planned wireless module wakeup time, and only in such event, performing operations comprising rescheduling the next planned Bluetooth scanning frequency change to occur substantially at the next planned wireless module wakeup time.

* * * * *